(12) United States Patent
Chen

(10) Patent No.: US 6,345,806 B1
(45) Date of Patent: Feb. 12, 2002

(54) FOOT-ACTUATED FAUCET

(76) Inventor: Jiun-Yan Chen, No. 6, Hsin-Chuang-Tsai Lane, Chung-Sha Rd., Hsin-Chuang Village, Lung-Ching Hsiang, Taichung Hsein (TW)

(*) Notice: Subject to any disclaimer, the term of this patent is extended or adjusted under 35 U.S.C. 154(b) by 0 days.

(21) Appl. No.: 09/711,696

(22) Filed: Nov. 13, 2000

(51) Int. Cl.[7] .......................... F16K 31/62; F16K 31/126
(52) U.S. Cl. ........................................ 251/331; 251/295
(58) Field of Search ................................ 251/295, 331, 251/268

(56) References Cited

U.S. PATENT DOCUMENTS

| | | | | |
|---|---|---|---|---|
| 2,884,953 A | * | 5/1959 | McWilliams | 251/295 X |
| 3,536,294 A | * | 10/1970 | Rodriguez | 251/295 X |
| 5,421,552 A | * | 6/1995 | Wang et al. | 251/295 X |
| 5,529,280 A | * | 6/1996 | Satoh et al. | 251/331 |
| 5,899,440 A | * | 5/1999 | Yoshihara | 251/331 |
| 6,076,804 A | * | 6/2000 | Cabrera | 251/295 X |
| 6,179,391 B1 | * | 1/2001 | Eberling et al. | 303/29 |
| 6,267,135 B1 | * | 7/2001 | Ho | 137/102 |

* cited by examiner

Primary Examiner—Kevin Lee
(74) Attorney, Agent, or Firm—Alan Kamrath; Rider, Bennett, Egan & Arundel, LLP

(57) ABSTRACT

A foot-actuated faucet includes a valve having a body, a bonnet attached to the body and a diaphragm mounted between the body and the bonnet to define a chamber in the bonnet. The body includes an inlet adapted to connect to a water source and an outlet to a spigot. A vertical outlet channel is formed in the body, connects to the outlet near the lower end and has a seat formed at the upper end. The seat is higher than the outlet. An actuating hole is defined in and extends through the bonnet, and an actuating tube connected to the actuating hole to communicate with the chamber. A hole with a diameter smaller than the actuating hole is defined in the diaphragm. An actuating device communicates with the chamber in the valve via the actuating tube and including an actuating valve movably received in the actuating device. The actuating valve includes a shank partially extending out of the actuating device and adapted to be stepped on by a user to selectively release pressure in the chamber. Thus the technique of controlling the flow of water has the foot-actuating device release the water pressure above the diaphragm thereby decreasing the cost of manufacturing and completely avoiding any electrical hazard.

8 Claims, 6 Drawing Sheets

FOOT-ACTUATED FAUCET

BACKGROUND OF THE INVENTION

1. Field of the Invention

The present invention relates to a faucet, and more particularly to a faucet that is foot actuated.

2. Description of Related Art

The conventional faucet is opened or closed by hand. Touching the faucet after the hands have been washed will likely contaminate the hands. With consideration for personal sanitation and sterile conditions, some places such as public toilets and hospitals use a faucet that has a sensor to control an electromagnetic valve to selectively open the faucet. This type of faucet can save water and prevent the user's hands from being contaminated, but it has several disadvantages.

1. The sensor in the conventional faucet uses infrared to sense the user's hands. This type of faucet is very expensive and cannot be widely used.
2. The sensor in the conventional faucet usually operates with an electrically driven electromagnetic valve. Use of electricity in close proximity to water presents a potentially serious safety hazard to personnel.
3. There is a cost to operate the electromagnetic valve in terms of the cost of the electricity. The cost of operation is even higher because the sensor must have power constantly so that it can sense the presence of a person.

The present invention has arisen to mitigate and/or obviate the disadvantages of the conventional tap.

SUMMARY OF THE INVENTION

A foot-actuated faucet in accordance with the present invention includes a valve having a body, a bonnet attached to the body and a diaphragm mounted between the body and the bonnet to define a chamber in the bonnet. The body includes an inlet to connect to a water source and an outlet. A vertical outlet channel is connected to the outlet at the lower end and a seat is formed on the upper end. An actuating hole is defined in the bonnet and extends from the chamber through the bonnet to an actuating tube connected to the actuating hole. A hole is defined in the diaphragm and has a diameter smaller than the actuating hole. An actuating device communicates with the chamber in the valve via the actuating tube and includes an actuating valve movably received in the actuating device. The actuating valve includes a shank partially extending out of the actuating device and configured to be pressed by the user's foot to selectively release pressure in the chamber. The drop in pressure in the chamber causes the valve to open and water to flow to the outlet of the valve.

Further benefits and advantages of the present invention will become apparent after a careful reading of the detailed description with appropriate reference to the accompanying drawings.

DETAILED DESCRIPTION OF THE INVENTION

Figure 1:
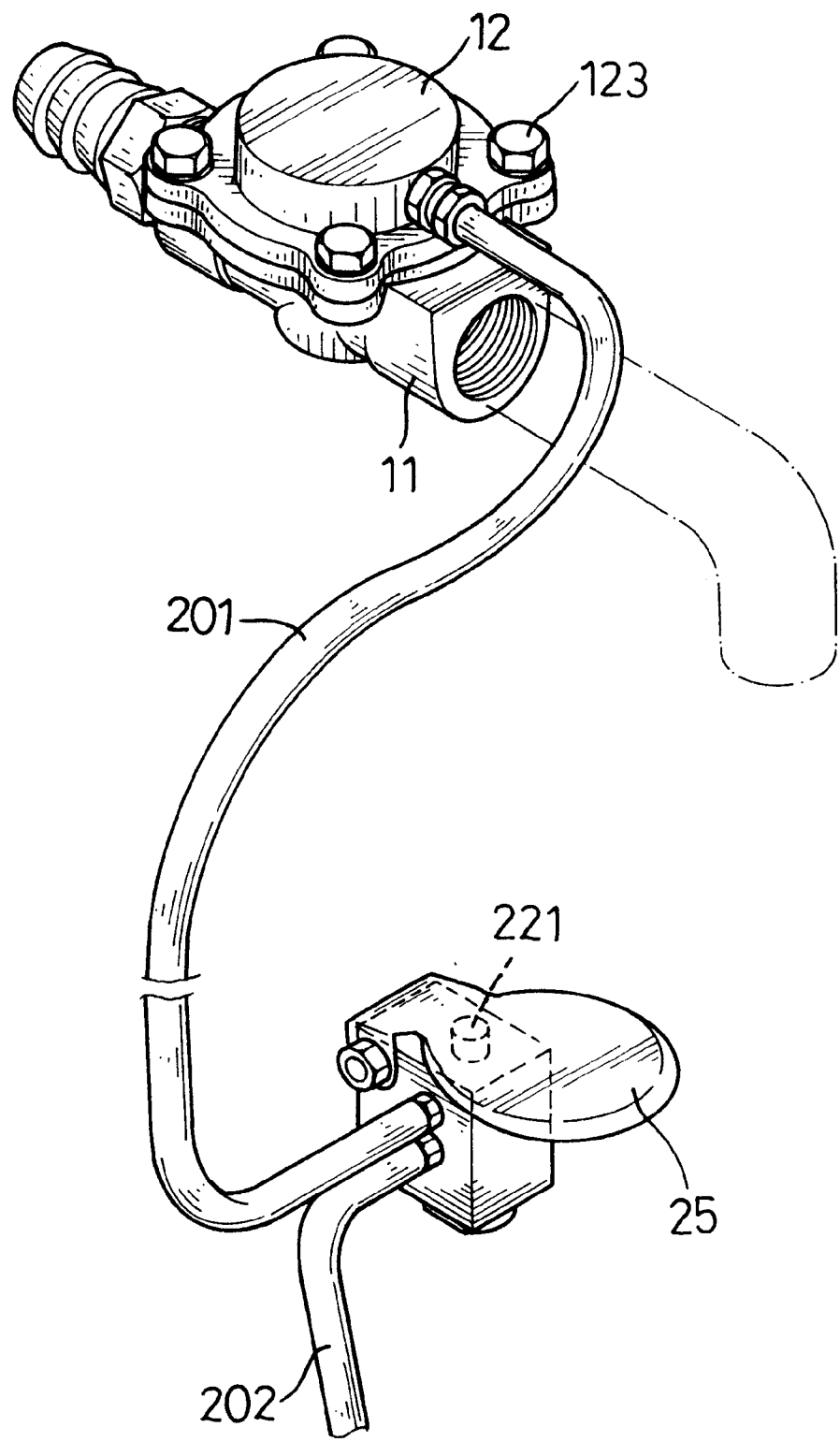
FIG. 1 is a perspective view of a foot-actuated faucet in accordance with the present invention.
Figure 2:
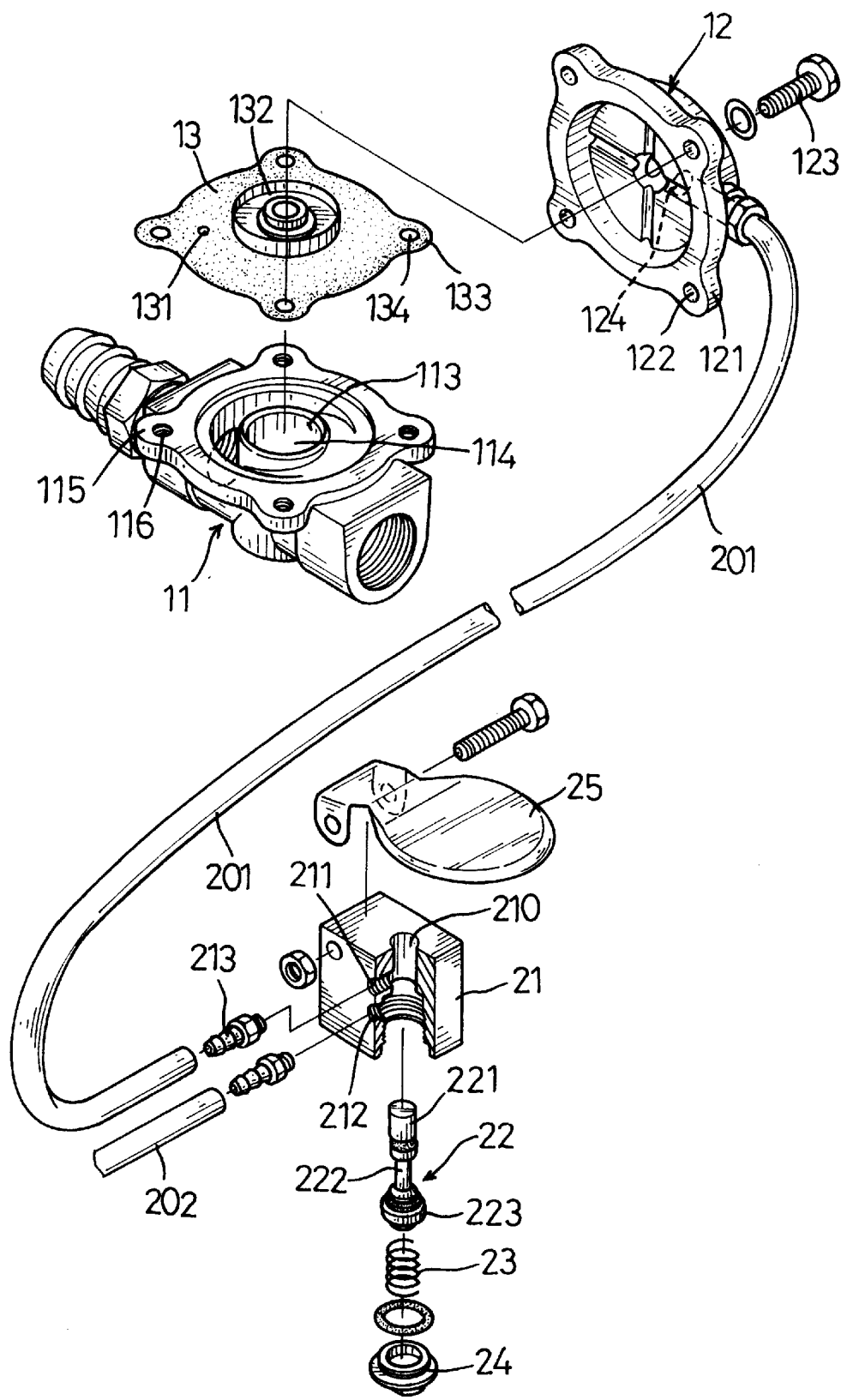
FIG. 2 is an explode perspective view of the foot-actuated faucet in FIG. 1.
Figure 4:
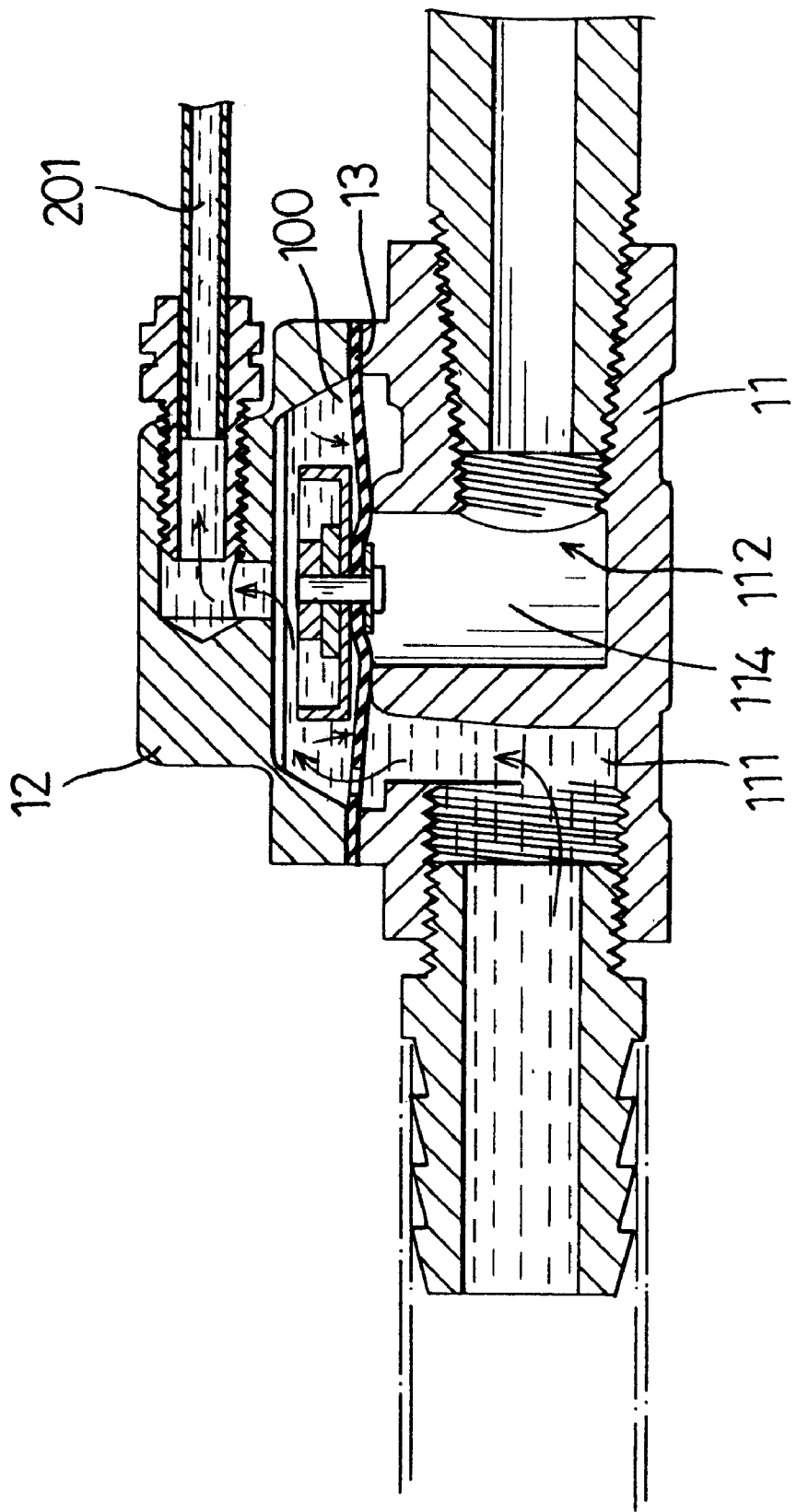
FIG. 4 is a cross sectional side plan view of the water valve in FIG. 1 when the valve is closed.

With reference to the drawings and initially to FIGS. 1, 2 and 4, a foot-actuated faucet in accordance with the present invention comprises a valve (10) and an actuating device (20) communicating with the valve (10) by an actuating tube (201).

The valve (10) includes a body (11), a bonnet (12) mounted on the body (11) and a diaphragm (13) mounted between the body (11) and the bonnet (12). A chamber (100) is defined between the diaphragm (13) and the bonnet (12). An inlet (11) is formed on one end of the body (11) to connect to a water source, and an outlet (112) is formed on the other end of the body (11) to connect to a spigot (not shown). A seat (113) is formed on the end of an outlet channel (114) that extends vertically into the body (11) and communicates with an outlet (112) such that the seat (113) is higher than the outlet (112). The outlet (112) horizontally extends through the valve (10) and forms an L-shaped with the outlet channel (114). Multiple ears (115) extend out from the open face of the body (11). A threaded hole (116) is defined in each of the ears (115).

The diaphragm (13) selectively closes the outlet channel (114) and the outlet (112) of the body (11) when the pressure in the chamber (100) increases. The diaphragm (13) is resilient, flexible material and is rubber in the preferred embodiment of the present invention. A hole (131) is defined in the diaphragm (13) so the chamber (100) in the bonnet (12) communicates with the inlet side of the body (10). A heavy block (132) is attached to the diaphragm (13) and is located in the chamber (100). The heavy block (132) corresponds to the seat (113) on the end of the outlet channel (114) to assist in securing the seal between the diaphragm (13) and the seat (113). The diaphragm (13) has an area big enough to fully cover the body (11). Multiple ears (133) corresponding to the ears (115) on the body (11) extend out from the diaphragm (13). Each of the ears (133) of the diaphragm (13) has a through hole (134) defined to correspond to the corresponding threaded hole (116) in the body (11).

An actuating hole (124) is defined in the closed end of the bonnet (12). The open end of the bonnet (12) is toward the body (11) and forms the chamber (100). The actuating hole (124) extends through the bonnet (12) to allow the chamber (100) to communicate with the actuating tube (201). The diameter of the actuating hole (124) is bigger than the hole (131) in the diaphragm (13) and smaller than the outlet channel (114) and the outlet (112). Multiple ears (121) extend out from the open end of the bonnet (12) and correspond to the ears (115, 133) on the body (10) and the diaphragm (13). Each of the ears (121) of the bonnet (12) includes a through hole (122) defined to align with one of the corresponding threaded holes (116) in the body (11). A bolt (123) extends through each of through holes (122, 134) in the bonnet (12) and the diaphragm (13) and screws into the corresponding threaded hole (116) in the body (11) to secure the bonnet (12) on the body (11).

The actuating device (20) comprises a body (21), an actuating valve (22) and a lever (25). The body (21) includes a valve chamber (210), an inlet (211) and an outlet (212). The valve chamber (210) is a vertical through hole with two diameters defined in the body (21). The smaller diameter portion of the valve chamber (210) is located in the top of the body (21), and the larger diameter portion of the valve chamber (210) is located in the bottom of the body (21). A shoulder (214) is formed at the junction of the larger and smaller portions of the valve chamber (210) and functions as the seat for the valve. A threaded inlet (211) is defined in the side of the body (21) and extends to the smaller diameter portion of the valve chamber (210). A threaded outlet (212) is defined in the side of the body (21) and extends to the larger diameter portion of the valve chamber (210). A nipple (213) is screwed into each of the threaded inlet (211) and outlet (212). The actuating tube (201) is pressed onto the nipple (213) screwed into the threaded inlet (211), and a discharge tube (202) is pressed onto the nipple (213) screwed into the threaded outlet (212).

An actuating valve (22) is movably mounted in the valve chamber (210). The actuating valve (22) includes a guide disk (223), a valve disk (224), a shank (221) and a neck (222). The shank (221) extends into the valve chamber (210) with the shank (221) at one end protruding from the top of the valve chamber (210) and the other end extending into the larger diameter portion of the valve chamber (210). A guide disk (223) is attached to the end of the actuating valve (22) that extends into the larger diameter portion of the valve chamber (210). The diameter of the guide disk (223) is only marginally smaller than the diameter of the larger diameter portion of the valve chamber (210) so that the actuating valve (22) will slide in the valve chamber (210) without undue transverse movement. The valve disk (224) is mounted on top of the guide disk (223) to abut the shoulder (214) in the valve chamber (214) and close the valve. The neck (222) is defined between the shank (221) and the guide disk (223). The shank (221) is movably received in the smaller diameter portion of the valve chamber (210) and partially extending out of the body (21). A spring (23) is compressively mounted in the larger diameter portion of the valve chamber (210) to provide a restoring force to the guide disk (223) and force the valve disk (224) firmly against the shoulder (214) to separate the smaller and the larger diameter portions of the valve chamber (210). A plug (24) is screwed into end of the larger diameter portion of the valve chamber (210) in the body (21) to close the valve chamber (210) and hold the spring (23) in place. A lever (25) is pivotally attached to the body (21) to press the shank (221) down when stepped on by a user.

Figure 3:
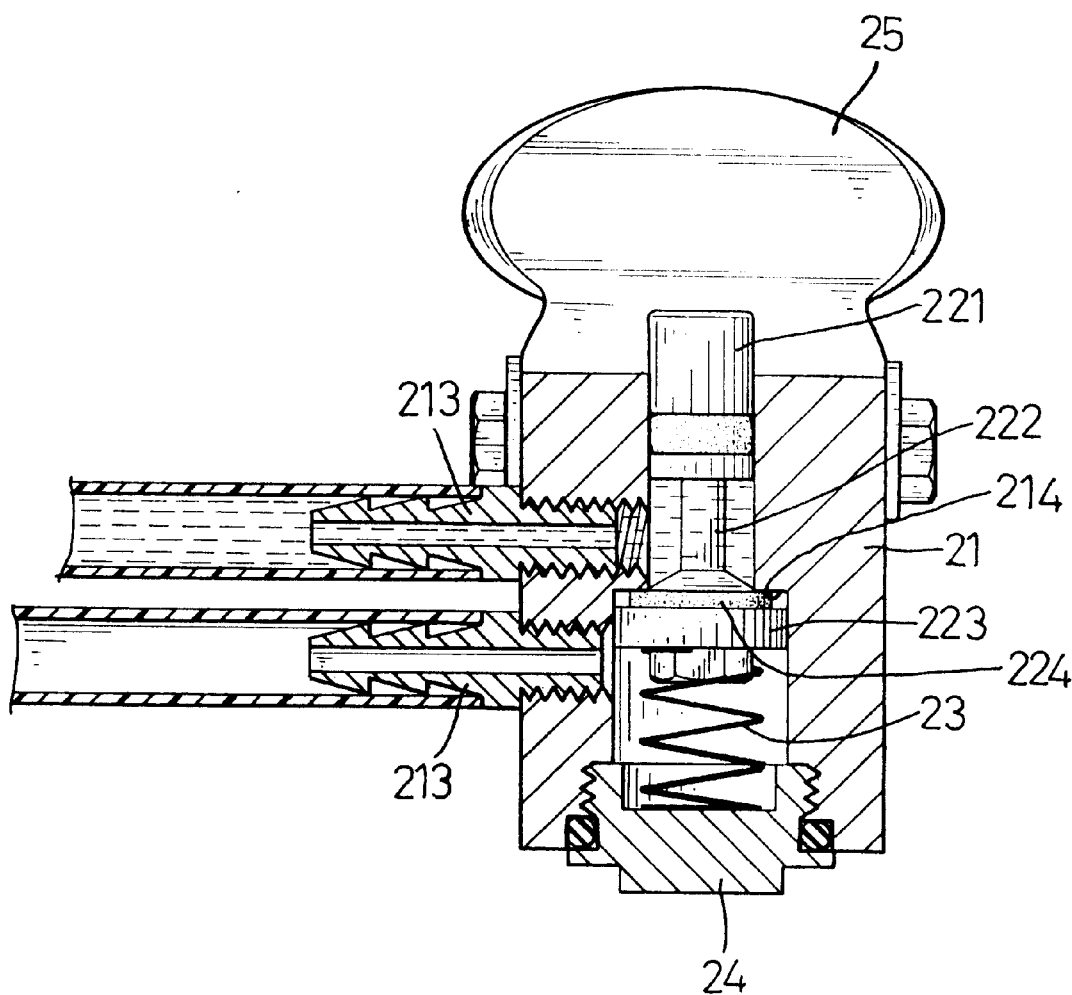
FIG. 3 is a front plan view in cross section of the foot-actuating device in FIG. 1 when the water valve is closed.

With reference to FIGS. 2, 3 and 4, in a steady state condition, the guide disk (223) abuts the shoulder (224) to isolate the inlet (211) and outlet (212) due to the restitution force of the spring (23). Consequently, the actuating tube (201) cannot communicate with the discharge tube (202), and the water pressure in the actuating tube (201) and the chamber (100) is the same as the pressure in the inlet (111) to the valve (10). The pressure is the same because water flows from the inlet (111) into the chamber (100) via the hole (131) in the diaphragm (13) and presses on the diaphragm (13) to hold it closed. The diaphragm (13) securely abuts the seat (113) on the outlet channel (114) to close the outlet (112) when the pressure in the chamber (100) becomes higher than that of the atmosphere.

Figure 5:
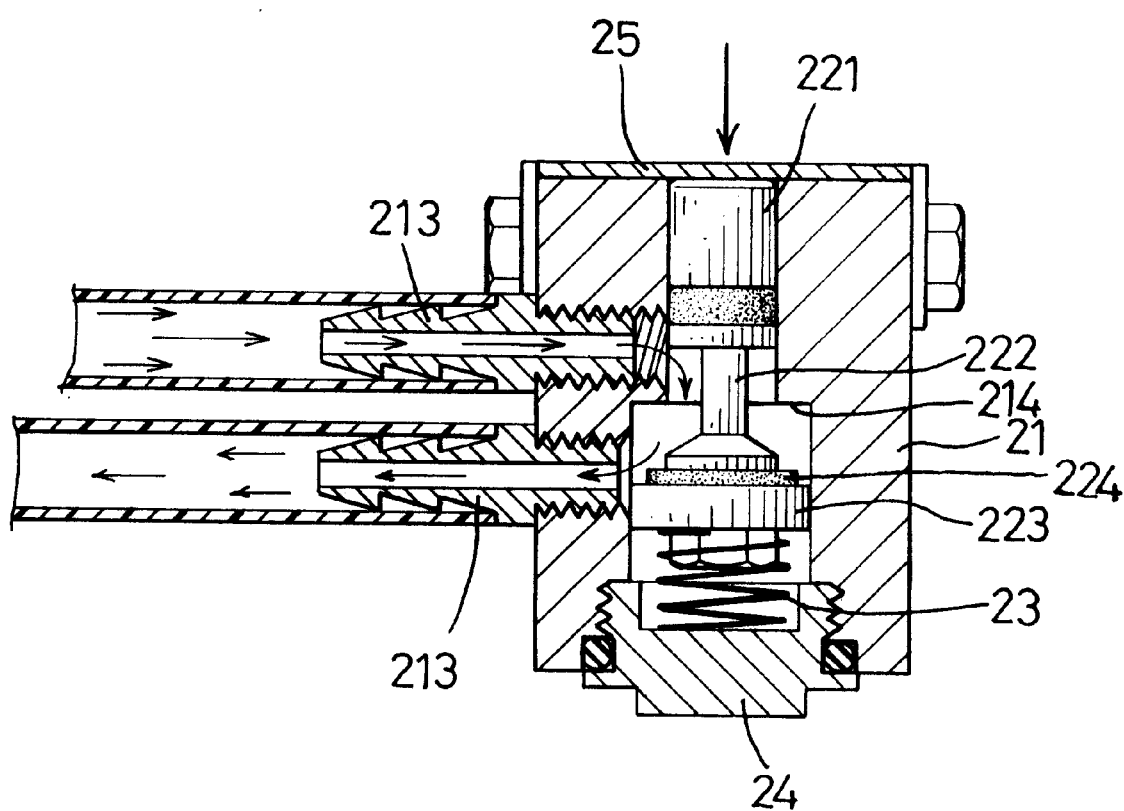
FIG. 5 is a cross sectional front plan view of the foot-actuating device in FIG. 1 when the valve is open.
Figure 6:
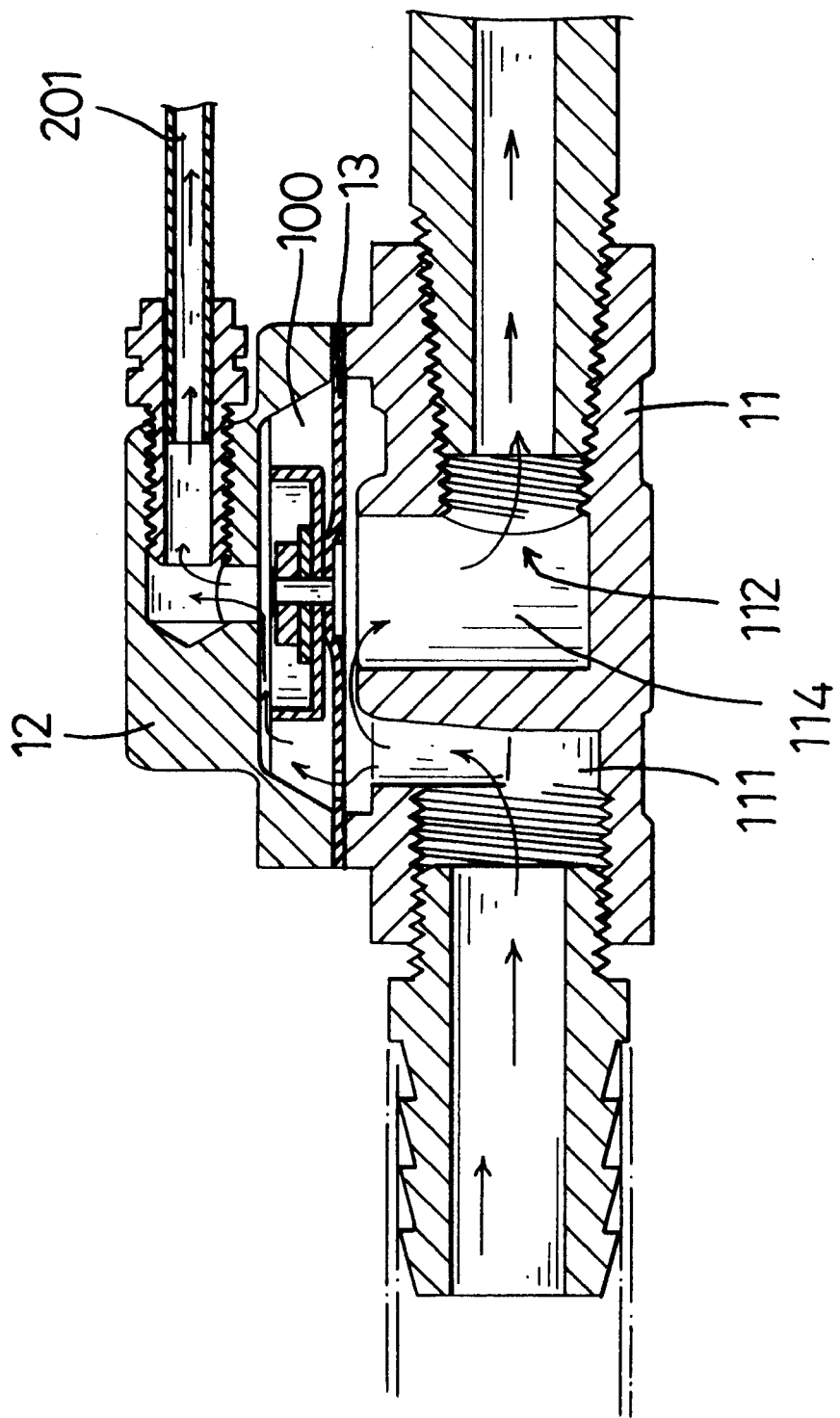
FIG. 6 is a cross sectional side plan view of the valve in FIG. 1 when the valve is open.

With reference to FIGS. 2, 5 and 6, when the lever (25) is pushed down against the protruding end of the shank (221), the movement of the shank (221) causes the guide disk (223) to press against the spring (23) and the valve disk (224) to separate from the shoulder (214). Fluid in the actuating tube (201) flows into the discharge tube (202) via the valve chamber (210) because the diameter of the neck (222) is smaller than the smaller diameter portion of valve chamber (210). When the actuating device (20) releases the pressure on the water in the actuating tube (201 ) and the chamber (100) of the valve (10), the resilient diaphragm (13) separates from the seat (113) and opens the outlet channel (114) to the inlet (111). When the valve (10) is open, very little water flows out of the actuating device (20) because the water pressure in the chamber (100) is relatively low. Furthermore, the diameter of the hole (131) in the diaphragm (13) is much smaller than the outlet (112) so the water flows out via the outlet (112) and not into the chamber (100) via the hole (131) in the diaphragm (13).

With reference to FIGS. 3 and 4, when the lever (25) is released, the spring (23) presses the guide disk (223) and the valve disk (224) against the shoulder (214) thereby shutting off the flow of water to the discharge tube (202). As water from the inlet (111) flows through the hole (131) in the diaphragm (13), the water pressure in the chamber (100) gradually increases, and the combination of the gravitational force on the block (132) and the increased water pressure in the chamber press the diaphragm (13) onto the seat (113) of the outlet channel (114) thereby shutting off the water to the outlet (114).

As described above, the foot-actuated faucet has several advantages.

1. The foot-actuated valve in accordance with the present invention has a simple structure and is easy to assemble so the cost of manufacturing is decreased.
2. No electrical hazard exists because the electromagnetic valve is unnecessary and electricity is saved.

Although the invention has been explained in relation to its preferred embodiment, it is to be understood that many other possible modifications and variations can be made without departing from the spirit and scope of the invention as hereinafter claimed.

What is claimed is:

1. A foot-actuated faucet comprising:
   a valve including a body, a bonnet mounted on said body and a diaphragm mounted between said body and said bonnet to define a chamber in said bonnet, said body including an inlet adapted to connect to a water source and an outlet, a vertical outlet channel with a seat formed on the upper end formed in the body of the valve and communicating with the outlet near the lower end with the outlet lower than the seat and allowing the outlet channel to communicate with an outer periphery of said body, an actuating hole defined in and extending through said bonnet, an actuating tube mounted to communicate with said chamber via said actuating hole, a hole defined in said diaphragm and having a diameter smaller than that of said actuating hole; and
   an actuating device communicating with said chamber of said valve via said actuating tube and including an actuating valve movably mounted in said actuating device, said actuating valve having a shank partially extending out of said actuating device and adapted to be stepped by a user to selectively release pressure in said chamber.
2. The foot-actuated faucet as claimed in claim 1, wherein said outlet channel and outlet forms an L-shaped, said outlet channel vertically extending toward said chamber and said outlet horizontally extending through said valve.
3. The foot-actuated faucet as claimed in claim 1, wherein said diaphragm comprises a heavy block attached to one side of said diaphragm opposite to body and corresponding to said seat on said outlet channel.

4. The foot-actuated faucet as claimed in claim 1, wherein said actuating device comprises a lever pivotally mounted on an outer periphery of said actuating device and abutting a free end of said shank of said actuating valve movably mounted in said actuating device.

5. The foot-actuated faucet as claimed in claim 1, wherein multiple ears extend horizontally out from both of said body and said bonnet, a threaded hole is defined in each of said ears of said body and said ears of said bonnet each having a through hole defined to align with one of said corresponding threaded holes in said ears of said body, said diaphragm including multiple ears extending out and each having a through hole defined to correspond to a threaded hole of said body, a bolt extending through said through holes of said ear in said bonnet and said diaphragm and screwed into said threaded hole in said body.

6. The foot-actuated faucet as claimed in claim 1, wherein said diaphragm is made of rubber.

7. The foot-actuated faucet as claimed in claim 3, wherein said diaphragm is made of rubber.

8. The foot-actuated faucet as claimed in claim 6, wherein said diaphragm is made of rubber.

\* \* \* \* \*